(12) United States Patent
Ji et al.

(10) Patent No.: US 11,584,507 B2
(45) Date of Patent: Feb. 21, 2023

(54) FOLDABLE WING WITH FOLDABLE TRAILING EDGE FLAP

(71) Applicant: Lanping Ji, Shenzhen (CN)

(72) Inventors: Lanping Ji, Shenzhen (CN); Jia Ji, Shenzhen (CN); Xu Wang, Shenzhen (CN)

(73) Assignee: Lanping Ji, Shenzhen (CN)

( * ) Notice: Subject to any disclaimer, the term of this patent is extended or adjusted under 35 U.S.C. 154(b) by 134 days.

(21) Appl. No.: 17/154,213

(22) Filed: Jan. 21, 2021

(65) Prior Publication Data
US 2022/0024557 A1    Jan. 27, 2022

(30) Foreign Application Priority Data

Jul. 27, 2020 (CN) .......................... 202010730070.8

(51) Int. Cl.
| | | |
|---|---|---|
| *B64C 3/56* | (2006.01) | |
| *B64C 3/18* | (2006.01) | |
| *B64C 3/26* | (2006.01) | |
| *B64C 3/28* | (2006.01) | |
| *B64C 3/30* | (2006.01) | |
| *B64C 9/02* | (2006.01) | |
| *B64C 9/20* | (2006.01) | |
| *B64C 13/38* | (2006.01) | |
| *B64C 9/00* | (2006.01) | |

(52) U.S. Cl.
CPC ................ *B64C 3/56* (2013.01); *B64C 3/187* (2013.01); *B64C 3/26* (2013.01); *B64C 3/28* (2013.01); *B64C 3/30* (2013.01); *B64C 9/02* (2013.01); *B64C 9/20* (2013.01); *B64C 13/38* (2013.01); *B64C 2009/005* (2013.01)

(58) Field of Classification Search
CPC .. B64C 3/56; B64C 3/187; B64C 3/26; B64C 3/28; B64C 3/30; B64C 9/02; B64C 9/20; B64C 13/38; B64C 2009/005
See application file for complete search history.

(56) References Cited

U.S. PATENT DOCUMENTS

| 2,147,360 | A | * | 2/1939 | Zaparka | .................... | B64C 9/00 |
|---|---|---|---|---|---|---|
| | | | | | | 244/212 |
| 3,666,210 | A | * | 5/1972 | Look | ......................... | B64C 3/56 |
| | | | | | | 244/218 |
| 5,645,250 | A | * | 7/1997 | Gevers | ................... | B64D 29/04 |
| | | | | | | 244/50 |

(Continued)

*Primary Examiner* — Rodney A Bonnette
(74) *Attorney, Agent, or Firm* — Jordan IP Law, LLC; Todd A. Vaughn (57) ABSTRACT

A foldable wing with foldable trailing edge flap, that includes a main wing and a foldable trailing edge flap. The main wing includes a wing supporting skeleton and a plurality of skin supporting ribs. The foldable trailing edge flap includes a plurality of crank-shaped flap supporting ribs, a flexible flap skin, a connecting shaft, and a return spring. The plurality of crank-shaped flap supporting ribs are hinged with lower surfaces of corresponding plurality of skin supporting ribs through the connecting shaft to form a foldable trailing edge flap supporting skeleton that relies on the plurality of skin supporting ribs. The return spring makes an upper surface of a long side of each crank-shaped flap supporting rib attach closely to a lower surface of each skin supporting rib. The flexible flap skin is attached to an upper surface of the foldable trailing edge flap supporting skeleton.

13 Claims, 8 Drawing Sheets a (56) References Cited

U.S. PATENT DOCUMENTS

| | | | |
|---|---|---|---|
| 7,762,500 B1* | 7/2010 | Dhall | B64C 39/12 |
| | | | 244/45 R |
| 10,577,076 B1* | 3/2020 | Wylonis | B64C 3/185 |
| 2017/0283035 A1* | 10/2017 | Ji | B64C 27/26 |
| 2021/0001973 A1* | 1/2021 | Witt | B64C 3/56 |
| 2021/0171185 A1* | 6/2021 | Brwon | B64C 3/185 |

* cited by examiner

FOLDABLE WING WITH FOLDABLE TRAILING EDGE FLAP

CROSS-REFERENCE TO RELATED APPLICATION

The present application claims priority to Chinese Patent Application No. 202010730070.8 (filed on Jul. 27, 2020), entitled "Foldable Wing with Foldable Trailing Edge Flap Face Recognition High Transparency Food-Grade Silicone Reusable Mask," the entire content of which is incorporated herein by reference.

TECHNICAL FIELD

The present application relates to the field of aviation technology, and in particular, to a foldable wing with foldable trailing edge flap.

BACKGROUND

In the prior art, Chinese Patent Application Nos. 201620324195.X, 201621063844.1, 201910263631.5, 201921875322.5, and U.S. Pat. No. 10,696,376B2 disclose a foldable wing that has the performance of a fixed-wing wing which is capable of being fully folded and unfolded, and can be widely used in various types of small, light, manned and unmanned aerial vehicles.

The existing foldable wing is mainly composed of a foldable multi-triangular supporting skeleton, a sliding rail, a skin supporting rib, an airbag inflatable skin, a flat foldable extended wing and an aileron thereof and a wing action device, forming a fixed-wing wing capable of being folded and unfolded.

The technical defect of the prior art is that the wing has an adjustable aileron, but there is no adjustable trailing edge flap, which limits the aerodynamic adjustment capability of the wing.

SUMMARY

The embodiments of the present application aim to provide a foldable wing with foldable trailing edge flap, so as to solve the defects of the existing foldable wing without trailing edge flap and the limited aerodynamic adjustment capability of the wing.

In the embodiments of the present application, a foldable trailing edge flap is installed at a trailing edge of the existing foldable wing, and the foldable trailing edge flap can deform synchronously with the foldable wing, after the foldable wing is unfolded, when an aircraft needs to increase lift of the wing, a flexible linkage cable is pulled by a flap drive device to drive each crank-shaped flap supporting rib to rotate around the connecting shaft synchronously, in such a way that the trailing edge flap is adjusted downward to increase the camber and area of the wing, change the aerodynamic shape of the wing and increase the lift of the wing.

The first embodiment of the present application provides a foldable wing with foldable trailing edge flap, comprising a main wing and a foldable trailing edge flap, wherein the main wing comprises a wing supporting skeleton, a sliding rail, a plurality of skin supporting ribs, a wing upper surface airbag inflatable skin, a wing lower surface skin and a aileron, the foldable trailing edge flap comprises a plurality of crank-shaped flap supporting ribs, a flexible flap skin, a connecting shaft, a flexible linkage main cable, a plurality of flexible linkage sub-cables, a plurality of linkage cable brackets, a return spring and a flap drive device, the flexible linkage main cable and each flexible linkage sub-cable are connected in parallel to form a flexible linkage cable; the plurality of crank-shaped flap supporting ribs are hinged with lower surfaces of corresponding plurality of skin supporting ribs through the connecting shaft to form a foldable trailing edge flap supporting skeleton that relies on the plurality of skin supporting ribs, the return spring makes an upper surface of a long side of each crank-shaped flap supporting rib attach closely to a lower surface of each skin supporting rib, and the flexible flap skin is attached to an upper surface of the foldable trailing edge flap supporting skeleton; each linkage cable bracket is installed on the lower surface of each skin supporting rib, and together with a short side of each crank-shaped flap supporting rib and the connecting shaft to form a spatial triangle; one end of each flexible linkage sub-cable is connected to a short side end of each crank-shaped flap supporting rib, and the other end is connected to the flexible linkage main cable, the flexible linkage main cable passes in series through cable holes on each linkage cable bracket, and a terminal of the flexible linkage main cable is connected to the flap drive device.

Further, after the foldable wing is unfolded, when an aircraft needs to increase lift of the wing, the flap drive device provides power, the flexible linkage main cable moves along the cable holes on each linkage cable bracket by pulling, and drives each flexible linkage sub-cable to move synchronously along the cable holes on each linkage cable bracket, and then pulls each crank-shaped flap supporting rib connected to each flexible linkage sub-cable to rotate synchronously around the connecting shaft, forming a whole piece of foldable trailing edge flap rotation and downward adjustment.

Further, when the aircraft returns to normal flight, the flap drive device releases the flexible linkage main cable, each flexible linkage sub-cable loses pulling force on each crank-shaped flap supporting rib, and the foldable trailing edge flap is reset affected by airflow on a lower surface of the wing and force of the return spring.

Further, when the foldable wing is folded, the wing supporting skeleton drives each skin supporting rib and a wing skin to fold toward a fuselage direction, and each skin supporting rib drives each crank-shaped flap supporting rib and the flexible flap skin as well as the flexible linkage cable to fold toward the fuselage direction synchronously.

Further, the foldable trailing edge flap further comprises a plurality of flexible flap skin holes, when the foldable trailing edge flap is adjusted downward, the plurality of flexible flap skin holes are configured to extend the airflow on the lower surface of the wing to a trailing edge of the wing.

Further, the foldable trailing edge flap further comprises a flexible associated skin, one end of the flexible associated skin is connected to a front end of the flexible flap skin, and the other end is connected to the wing lower surface skin, the flexible associated skin is made up of a flexible material or an elastic material.

The second embodiment of the present application provides a foldable wing with foldable trailing edge flap, different from the first embodiment of the present application, wherein a trailing edge of each skin supporting rib has a stepped structure, the wing lower surface skin is connected to a lower step surface of each skin supporting rib; each crank-shaped flap supporting rib has a stepped structure, the flexible flap skin is connected to an upper step surface of each crank-shaped flap supporting rib; each crank-shaped flap supporting rib is connected to the lower surface of each skin supporting rib through the connecting shaft, in a normal flight state, under the force of the return spring, the upper step surface of each crank-shaped flap supporting rib is fit close to the lower step surface of each skin supporting rib.

Further, the foldable trailing edge flap further comprises a plurality of flap slits, when the foldable trailing edge flap is adjusted downward, the plurality of flap slits are formed between a lower step area of each crank-shaped flap supporting rib and the wing lower surface skin, the plurality of flap slits are configured to extend the airflow on the lower surface of the wing to a trailing edge of the wing.

Further, the flap drive device provides power for the flexible linkage cable through a swing arm, a variable speed gear or a chain.

Compared with the prior art, the foldable wing with foldable trailing edge flap provided by the embodiments of the present application has the following beneficial effects: it enables the foldable wing to have functions of flap and flap adjustment, which cooperates with the aileron, in such a way that the foldable wing has main functions of the existing fixed-wing wing; the foldable trailing edge flap is completely attached to the main wing, has a simple structure and a improved function. The application can be applied to an aircraft that needs to increase the lift of the wing through flap adjustment, thereby expanding the application range of the foldable wing.

BRIEF DESCRIPTION OF THE DRAWINGS

The present application will be described in detail below with reference to the accompanying drawings.

DESCRIPTION OF THE EMBODIMENTS

In order to make the technical problems to be solved, technical solutions and beneficial effects of the present application more clearly, the present application is described in detail below in combination with the accompanying drawings and embodiments. Two forms of foldable wings with foldable trailing edge flap are shown in the accompanying drawings. A person of ordinary skill in the art should understand that other forms of foldable wings with foldable trailing edge flap can also be obtained by adopting the same principle, all of which should be included within the protection scope of the present application.

The first embodiment of the present application provides a foldable wing with foldable trailing edge flap, comprising a main wing and a foldable trailing edge flap, wherein the main wing includes a wing supporting skeleton 1, a sliding rail 2, a plurality of skin supporting ribs 3, a wing upper surface airbag inflatable skin 4, a wing lower surface skin 5 and a aileron 6, the foldable trailing edge flap includes a plurality of crank-shaped flap supporting ribs 7, a flexible flap skin 8, a connecting shaft 9, a flexible linkage main cable 10, a plurality of flexible linkage sub-cables 11, a plurality of linkage cable brackets 12, a return spring 13 and a flap drive device 17, wherein the flexible linkage main cable 10 and each flexible linkage sub-cable 11 are connected in parallel to form a flexible linkage cable.

Figure 1:
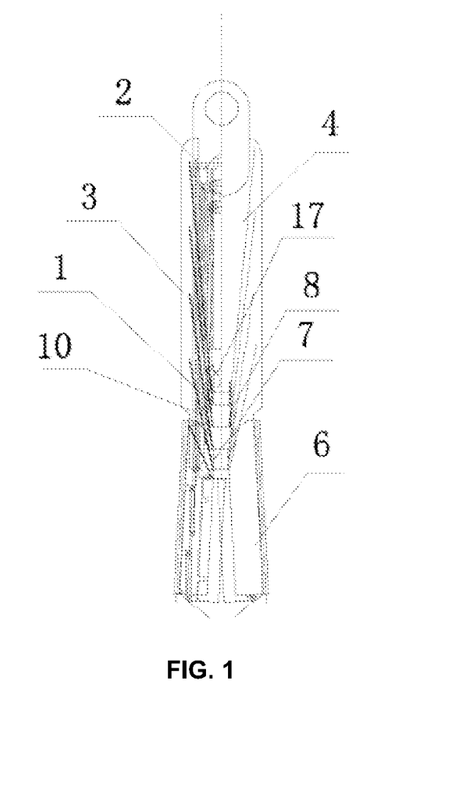
FIG. 1 is a schematic view of a foldable wing with foldable trailing edge flap which is fully folded in the first embodiment of the present application, in which the left half shows the structure and the right half shows the plane.
Figure 2:
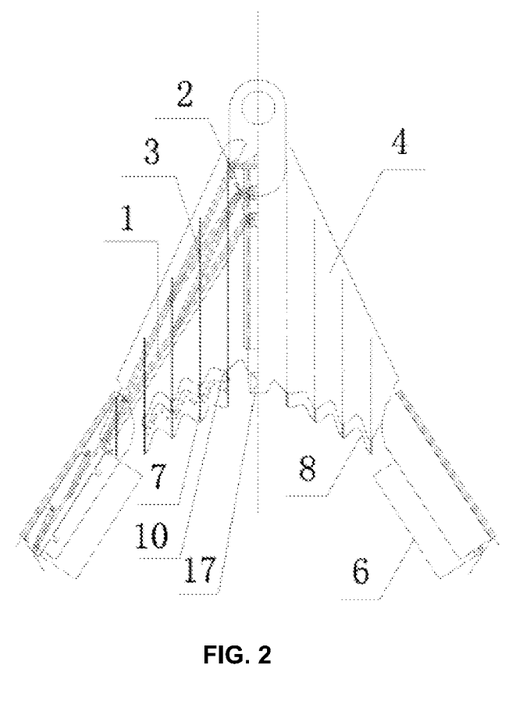
FIG. 2 is a schematic view of a foldable wing with foldable trailing edge flap which is semi-unfolded in the first embodiment of the present application, in which the left half shows the structure and the right half shows the plane.
Figure 3:
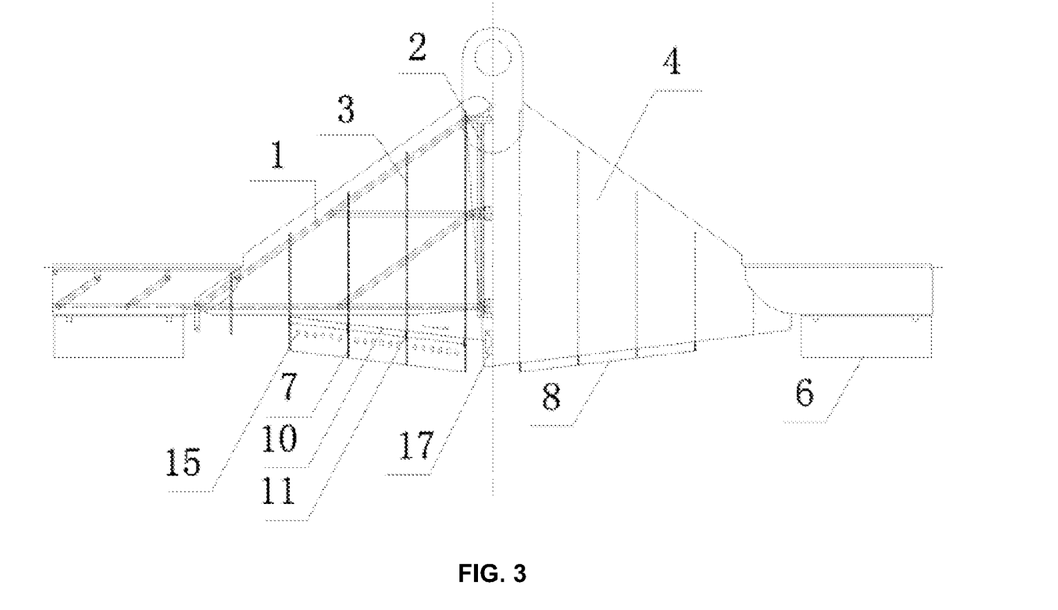
FIG. 3 is a schematic view of a foldable wing with foldable trailing edge flap which is fully unfolded in the first embodiment of the present application, in which the left half shows the structure and the right half shows the plane.

FIG. 1, FIG. 2 and FIG. 3 show fully folded, semi-unfolded and fully unfolded processes of a foldable wing with foldable trailing edge flap, wherein the left half shows the structure and the right half shows the plane.

FIG. 1 shows a schematic view of a state of a foldable wing with foldable trailing edge flap when the wing is fully folded. When the foldable wing is folded, the wing supporting skeleton 1 drives each skin supporting rib 3 and a wing skin to fold toward a fuselage direction, and each skin supporting rib 3 drives each crank-shaped flap supporting rib 7 and the flexible flap skin 8 as well as the flexible linkage cable to fold toward the fuselage direction synchronously, completing a folded process of the foldable wing with foldable trailing edge flap.

FIG. 2 shows a unfolded process of a foldable wing with foldable trailing edge flap, wherein the wing supporting skeleton drives each skin supporting rib 3 and the wing skin to expand outward, and each skin supporting rib 3 drives each crank-shaped flap supporting rib 7 and the flexible flap skin 8 as well as the flexible linkage cable to expand outward synchronously. After the foldable wing is unfolded, the plurality of skin supporting ribs 3 are pulled by the wing skin and are in a fixed position, at this time, the plurality of skin supporting ribs 3 rely on the wing supporting skeleton 1 and is capable of withstand a aerodynamic load of the wing.

FIG. 3 shows a foldable wing with foldable trailing edge flap when the wing is fully unfolded, each skin supporting rib 3 drives each crank-shaped flap supporting rib 7 to unfold and tighten the flexible flap skin 8, forming the foldable wing with foldable trailing edge flap.

Figure 4:
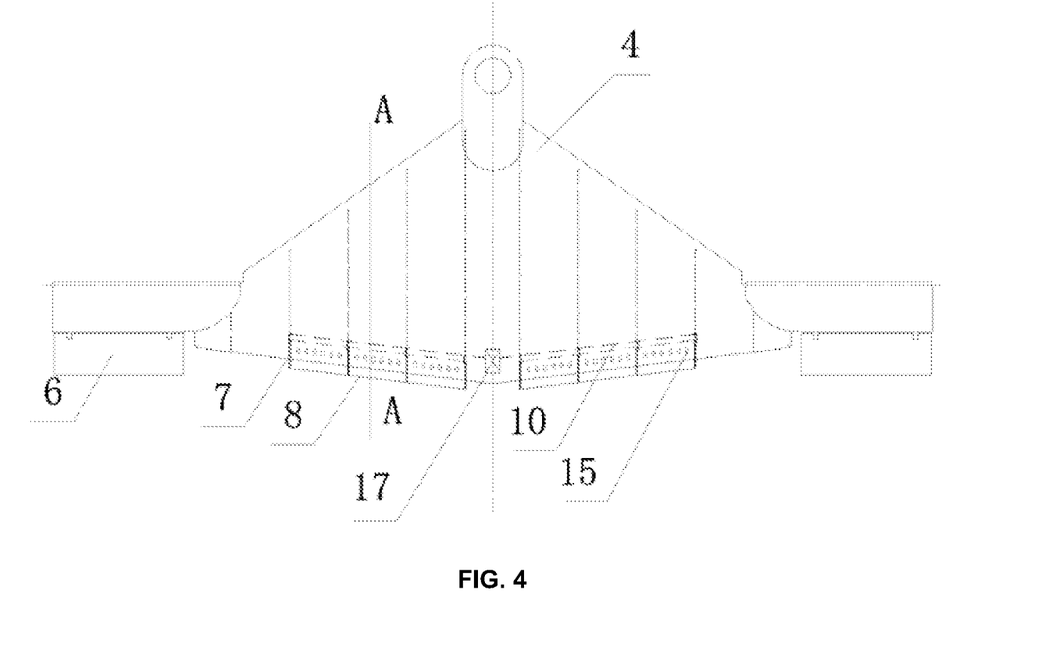
FIG. 4 is a schematic planar view of a foldable wing with foldable trailing edge flap which is fully unfolded in the first embodiment of the present application.
Figure 5:
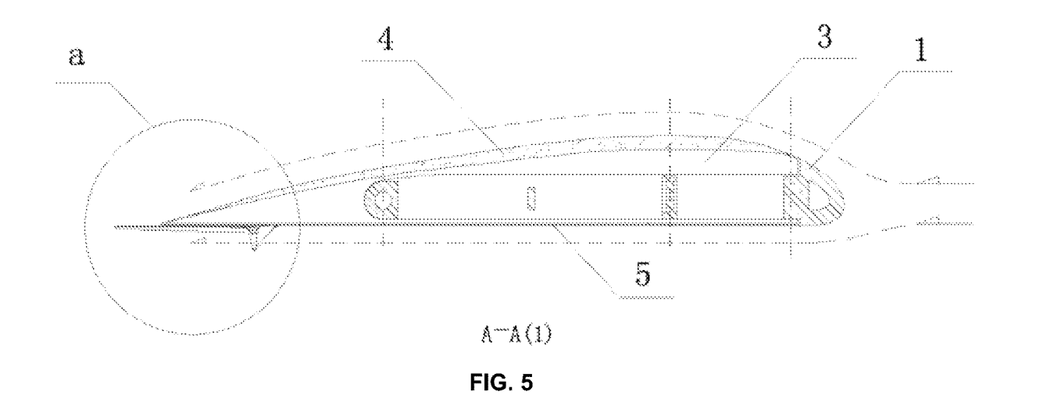
FIG. 5 is an A-A (1) cross-sectional view of the foldable wing in FIG. 4.

FIG. 4 is a schematic planar view of a foldable wing with foldable trailing edge flap which is fully unfolded; FIG. 5 is an A-A (1) cross-sectional view of the foldable wing in FIG. 4, which shows the cross-sectional relationship between the foldable trailing edge flap and the main wing.

Figure 6:
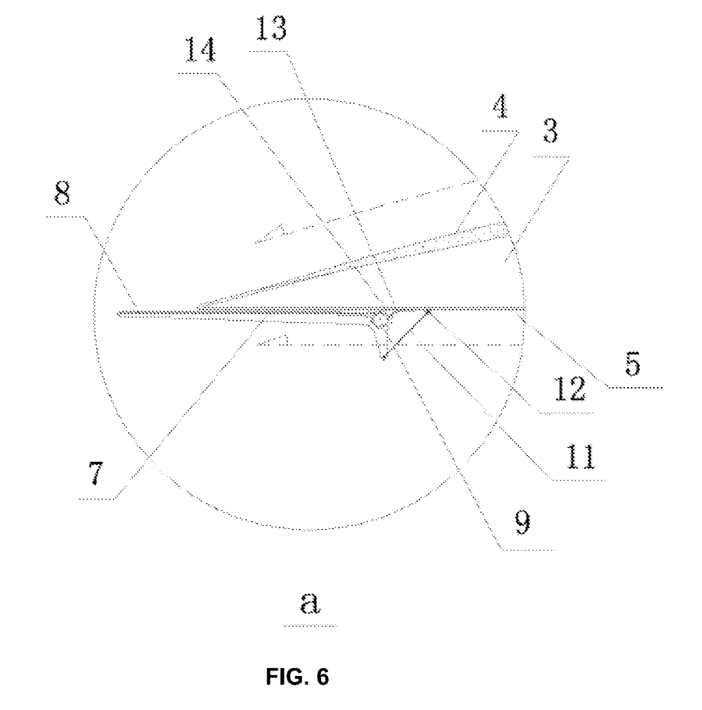
FIG. 6 is a local enlarged view of a in FIG. 5.

FIG. 6 is a local enlarged view of a in FIG. 5, which shows that: in an appropriate position on a lower surface of a trailing edge of each skin supporting rib 3, each crank-shaped flap supporting rib 7 is hinged with each skin supporting rib 3 through the connecting shaft 9, and the return spring 13 makes an upper surface of a long side of each crank-shaped flap supporting rib 7 attach closely to a lower surface of each skin supporting rib 3, and the flexible flap skin 8 is attached to an upper surface of each crank-shaped flap supporting rib 7 and is close to the wing lower surface skin 5.

Further, each linkage cable bracket 12 is installed on the lower surface of each skin supporting rib 3, and together with a short side of each crank-shaped flap supporting rib 7 and the connecting shaft 9 to form a spatial triangle.

Further, one end of each flexible linkage sub-cable 11 is connected to a short side end of each crank-shaped flap supporting rib 7, and the other end is connected to the flexible linkage main cable 10, the flexible linkage main cable 10 passes through cable holes on each linkage cable bracket 12, and a terminal of the flexible linkage main cable 10 is connected to the flap drive device 17.

As shown in FIG. 3, the plurality of crank-shaped flap supporting ribs 7 and corresponding plurality of skin supporting ribs 3 are hinged in the same way as described above, forming a foldable trailing edge flap supporting skeleton that relies on the plurality of skin supporting ribs 3.

Further, the flexible flap skin 8 is connected to an upper surface of the foldable trailing edge flap supporting skeleton, forming a force surface of the foldable trailing edge flap that bears airflow.

Further, when an aircraft needs to increase lift of the wing, the flap drive device 17 provides power to pull the flexible linkage main cable 10 to move along the cable holes on each linkage cable bracket 12, thereby driving each flexible linkage sub-cable 11 connected in parallel with the flexible linkage main cable 10 to move synchronously along the cable holes on each linkage cable bracket 12, and further pulling each crank-shaped flap supporting rib 7 connected to each flexible linkage sub-cable 11 and the flexible flap skin 8 connected to the upper surface of each crank-shaped flap supporting rib 7 to rotate synchronously around the connecting shaft 9, forming a whole piece of foldable trailing edge flap rotation and downward adjustment to increase the camber and area of the wing, change the aerodynamic shape of the wing and increase the lift of the wing.

When the aircraft returns to normal flight, the flap drive device 17 releases the flexible linkage main cable 10, each flexible linkage sub-cable 11 connected in parallel with the flexible linkage main cable 10 loses pulling force on each crank-shaped flap supporting rib 7, and the foldable trailing edge flap is reset affected by airflow on a lower surface of the wing and force of the return spring 13.

Figure 7:
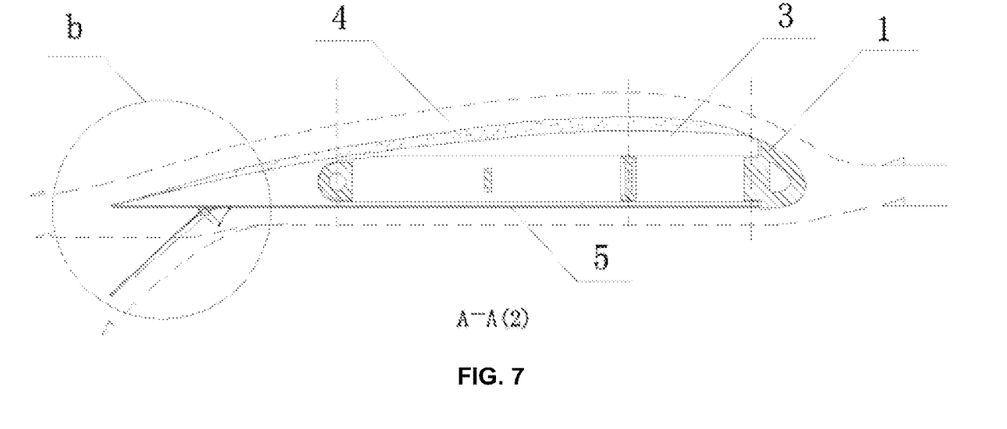
FIG. 7 is an A-A (2) cross-sectional view of the foldable wing in FIG. 4.
Figure 8:
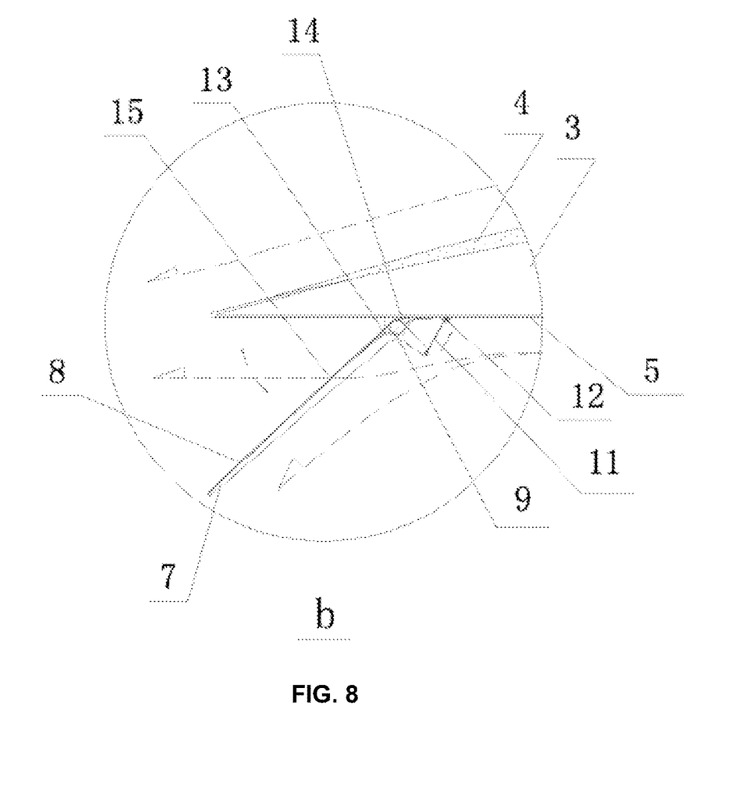
FIG. 8 is a local enlarged view of b in FIG. 7.

FIG. 7 is an A-A (2) cross-sectional view of the foldable wing in FIG. 4, which shows cross-sectional shape of the wing after the foldable trailing edge flap is adjusted downward. FIG. 8 is a local enlarged view of b in FIG. 7, which shows shape of each crank-shaped flap supporting rib 7 rotating around the connecting shaft 9 and adjusting downward under the pulling force of each flexible linkage sub-cable 11.

Referring to FIG. 6 and FIG. 8, the foldable trailing edge flap further includes a flexible associated skin 14. One end of the flexible associated skin 14 is connected to a front end of the flexible flap skin 8, and the other end is connected to the wing lower surface skin 5. When the foldable trailing edge flap is not adjusted, it can weaken disturbance to the flexible flap skin 8 caused by the airflow on the lower surface of the wing. The flexible associated skin 14 may be made up of a flexible material or an elastic material.

Referring to FIGS. 3, 4 and 8, the foldable trailing edge flap further includes a plurality of flexible flap skin holes 15, and the plurality of flexible flap skin holes 15 are a number of small holes provided on the flexible flap skin 8. When the foldable trailing edge flap is adjusted downward, the airflow on the lower surface of the wing extends to a trailing edge of the wing through the plurality of flexible flap skin holes 15, which can not only accelerate an airflow velocity at the trailing edge of the wing and delay a laminar airflow damage on an upper surface of the wing, but also weaken a vortex influence of a reverse side of the foldable trailing edge flap.

Figure 9:
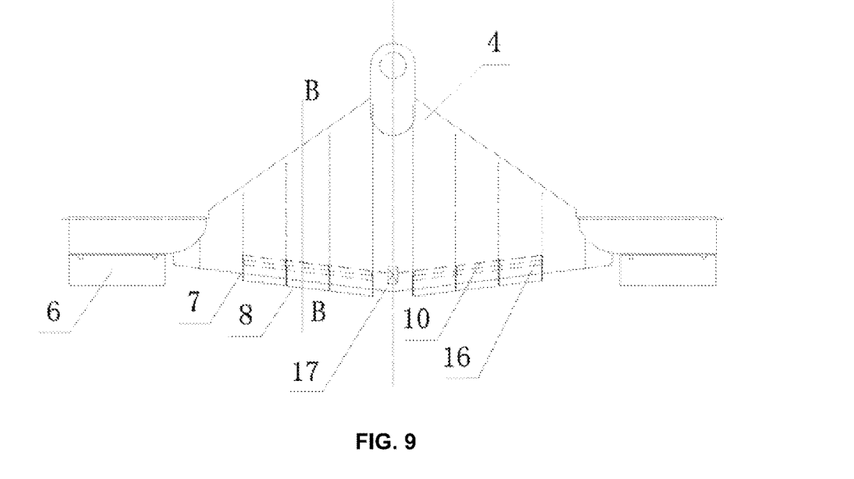
FIG. 9 is a schematic planar view of a foldable wing with foldable trailing edge flap including a plurality of flap slits which is fully unfolded in the second embodiment of the present application.

Referring to FIG. 9, the second embodiment of the present application provides another foldable wing with foldable trailing edge flap, instead of the flexible flap skin holes 15 in the first embodiment of the present application, the foldable trailing edge flap in the second embodiment of the present application further includes a plurality of flap slits 16.

Figure 10:
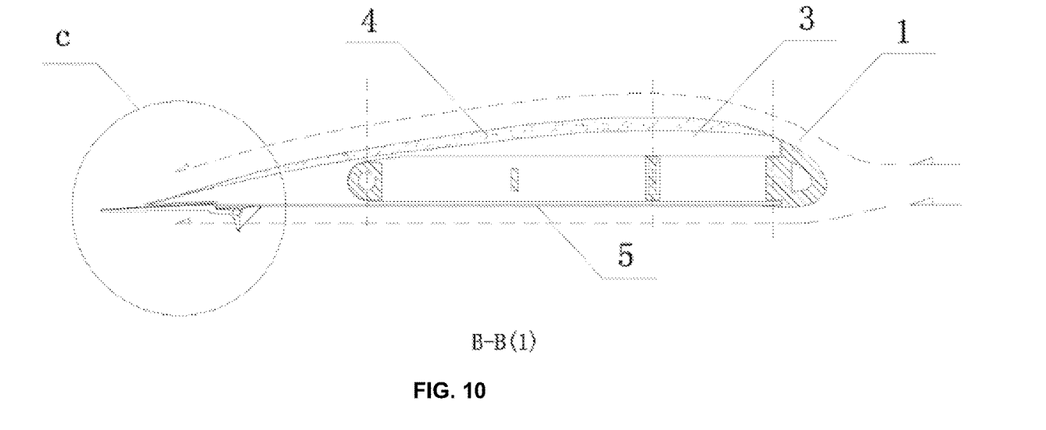
FIG. 10 is a B-B (1) cross-sectional view of the foldable wing in FIG. 9.

FIG. 10 is a B-B (1) cross-sectional view of the foldable wing in FIG. 9, which shows the cross-sectional relationship between the main wing and the foldable trailing edge flap.

Figure 11:
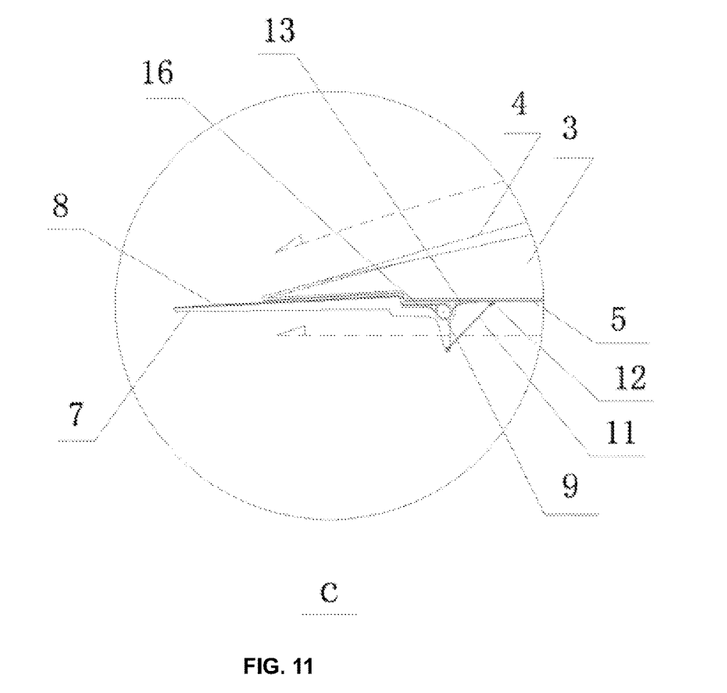
FIG. 11 is a local enlarged view of c in FIG. 10.

FIG. 11 is a local enlarged view of c in FIG. 10, which shows that: different from the above-mentioned first embodiment of the present application, each skin supporting rib 3 in the second embodiment of the present application has a stepped deformation at a trailing edge thereof, and the wing lower surface skin 5 connected thereto also has a stepped deformation accordingly.

Further, each crank-shaped flap supporting rib 7 also has a stepped deformation correspondingly, the flexible flap skin 8 is connected to an upper step surface of each crank-shaped flap supporting rib 7, a lower step surface of each crank-shaped flap supporting rib 7 has no skin and is an area where the plurality of flap slits 16 provided.

Further, each crank-shaped flap supporting rib 7 is connected to the lower surface of each skin supporting rib 3 through the connecting shaft 9, in a normal flight state, under the force of the return spring 13, the upper step surface of each crank-shaped flap supporting rib 7 is fit close to a lower step surface of each skin supporting rib 3, and the front end of the flexible flap skin 8 is hidden behind steps formed by the wing lower surface skin 5, which weakens an impact on a front end of the foldable trailing edge flap caused by the airflow on the lower surface of the wing.

Figure 12:
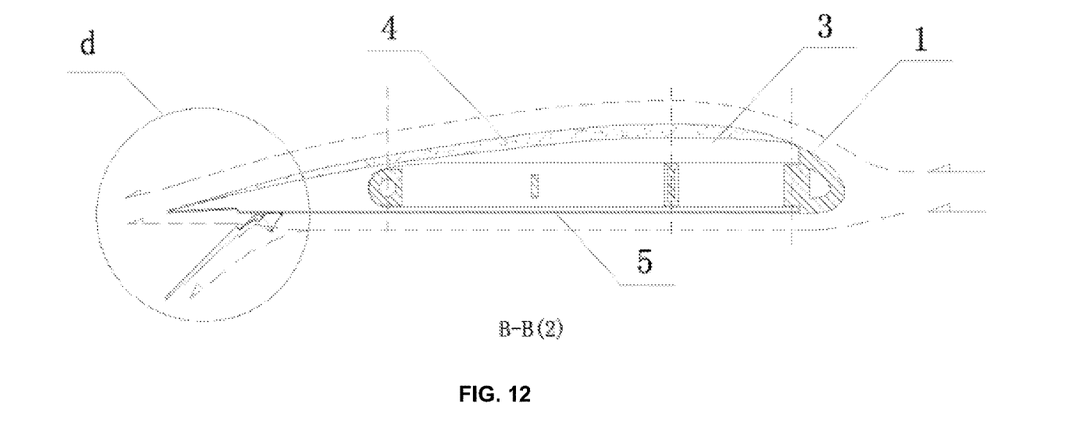
FIG. 12 is a B-B (2) cross-sectional view of the foldable wing in FIG. 9.

FIG. 12 is a B-B (2) cross-sectional view of the foldable wing in FIG. 9, which shows the cross-sectional relationship between the foldable trailing edge flap after downward adjustment and the main wing.

Figure 13:
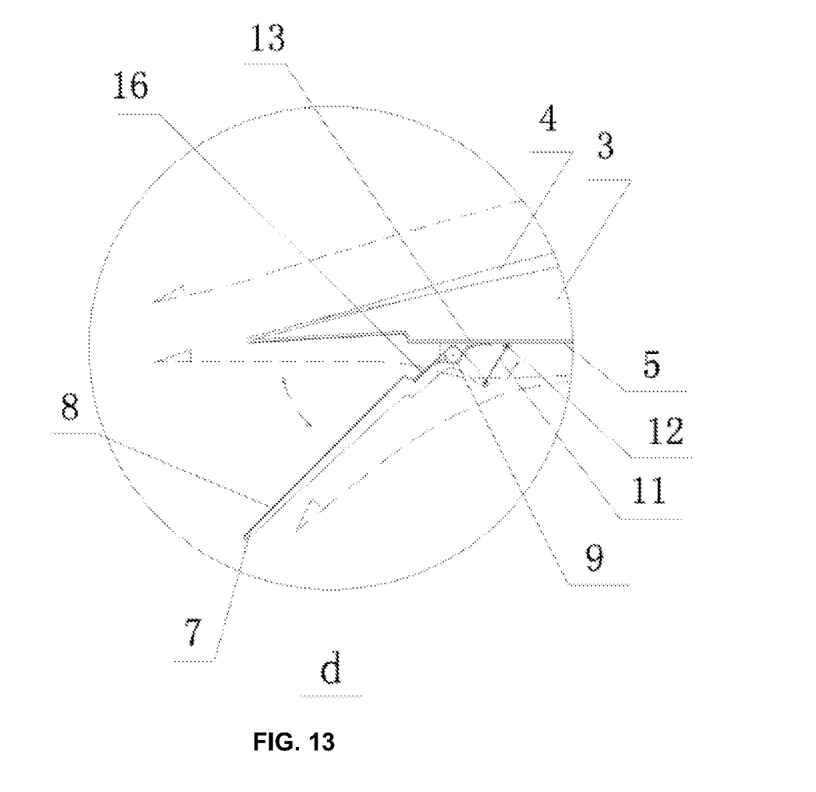
FIG. 13 is a local enlarged view of d in FIG. 12.

FIG. 13 is a local enlarged view of d in FIG. 12, which shows that: when the foldable trailing edge flap is adjusted downward, a plurality of flap slits 16 are formed between a lower step area of each crank-shaped flap supporting rib 7 and the wing lower surface skin 5, the airflow on the lower surface of the wing extends to a trailing edge of the wing through the plurality of flap slits 16, which can not only accelerate an airflow velocity at the trailing edge of the wing and delay a laminar airflow damage on an upper surface of the wing, but also weaken a vortex influence of a reverse side of the foldable trailing edge flap.

A person of ordinary skill in the art should understand that the flap drive device 17 can provide power for the flexible linkage cable in various ways, for example, using a swing arm, a variable speed gear or a chain.

The foldable wing with foldable trailing edge flap provided by the embodiments of the present application enables the foldable wing to have functions of flap and flap adjustment, which cooperates with the aileron, in such a way that the foldable wing has main functions of the existing fixed-wing wing; the foldable trailing edge flap is completely attached to the main wing, has a simple structure and a improved function. The application can be applied to an aircraft that needs to increase the lift of the wing through flap adjustment, thereby expanding the application range of the foldable wing.

Those skilled in the art should also understand that the technical solution of the present application can be applied to the Fowler flap.

The third embodiment of the present application provides a flying car comprising the foldable wing with foldable trailing edge flap of the present application. In the take-off and landing stages of the flying car, the flap is adjusted to increase the lift of the wing, so that the flying car can take off and land safely.

The above are only preferred embodiments of the present application, and do not limit the present application, any modification, equivalent replacement and improvement made within the principle of the present application should be included in the protection scope of the present application.

LIST OF REFERENCE NUMERALS

1: wing supporting skeleton
2: sliding rail
3: skin supporting rib
4: wing upper surface airbag inflatable skin
5: wing lower surface skin
6: aileron
7: crank-shaped flap supporting rib
8: flexible flap skin
9: connecting shaft
10: flexible linkage main cable
11: flexible linkage sub-cable
12: linkage cable bracket
13: return spring
14: flexible associated skin
15: flexible flap skin hole
16: flap slit
17: flap drive device

What is claimed is:

1. A foldable wing with foldable trailing edge flap, the foldable wing comprising:
   a main wing that includes a wing supporting skeleton, a sliding rail, a plurality of skin supporting ribs, a wing upper surface airbag inflatable skin, a wing lower surface skin, and an aileron; and
   a foldable trailing edge flap that includes a plurality of crank-shaped flap supporting ribs, a flexible flap skin, a connecting shaft, a flexible linkage main cable, a plurality of flexible linkage sub-cables, a plurality of linkage cable brackets, a return spring, and a flap drive device.

2. The foldable wing with foldable trailing edge flap of claim 1, wherein the flexible linkage main cable and each flexible linkage sub-cable are arranged in parallel.

3. The foldable wing with foldable trailing edge flap of claim 1, wherein:
   the plurality of crank-shaped flap supporting ribs are hinged with lower surfaces of the plurality of skin supporting ribs through the connecting shaft to form a foldable trailing edge flap supporting skeleton,
   the return spring makes an upper surface of a long side of each crank-shaped flap supporting rib attach closely to a lower surface of each skin supporting rib, and
   the flexible flap skin is attached to an upper surface of the foldable trailing edge flap supporting skeleton.

4. The foldable wing with foldable trailing edge flap of claim 1, wherein each linkage cable bracket is installed onto the lower surface of corresponding skin supporting rib, and together with a short side of each crank-shaped flap supporting rib and the connecting shaft to form a spatial triangle.

5. The foldable wing with foldable trailing edge flap of claim 1, wherein:
   one end of each flexible linkage sub-cable is connected to a short side end of each crank-shaped flap supporting rib, and the other end is connected to the flexible linkage main cable,
   the flexible linkage main cable passes in series through cable holes on each linkage cable bracket, and
   a terminal of the flexible linkage main cable is connected to the flap drive device.

6. The foldable wing with foldable trailing edge flap of claim 1, wherein after the foldable wing is unfolded, when an aircraft needs to increase lift of the wing, the flap drive device provides power, the flexible linkage main cable moves along the cable holes on each linkage cable bracket by pulling, and drives each flexible linkage sub-cable to move synchronously along the cable holes on each linkage cable bracket, and then pulls each crank-shaped flap supporting rib connected to each flexible linkage sub-cable to rotate synchronously around the connecting shaft, forming a whole piece of foldable trailing edge flap rotation and downward adjustment.

7. The foldable wing with foldable trailing edge flap of claim 1, wherein when the aircraft returns to normal flight, the flap drive device releases the flexible linkage main cable, each flexible linkage sub-cable loses pulling force on each crank-shaped flap supporting rib, and the foldable trailing edge flap is reset affected by airflow on a lower surface of the wing and force of the return spring.

8. The foldable wing with foldable trailing edge flap of claim 1, wherein when the foldable wing is folded, the wing supporting skeleton drives each skin supporting rib and a wing skin to fold toward a fuselage direction, and each skin supporting rib drives each crank-shaped flap supporting rib and the flexible flap skin as well as the flexible linkage main cable to fold toward the fuselage direction synchronously.

9. The foldable wing with foldable trailing edge flap of claim 1, wherein:
   the foldable trailing edge flap further comprises a plurality of flexible flap skin holes, and
   when the foldable trailing edge flap is adjusted downward, the plurality of flexible flap skin holes are configured to extend the airflow on the lower surface of the wing to a trailing edge of the wing.

10. The foldable wing with foldable trailing edge flap of claim 1, wherein:
    the foldable trailing edge flap further comprises a flexible associated skin, and
    one end of the flexible associated skin is connected to a front end of the flexible flap skin, and the other end is connected to the wing lower surface skin, the flexible associated skin is made up of a flexible material or an elastic material.

11. The foldable wing with foldable trailing edge flap of claim 1, wherein:
    a trailing edge of each skin supporting rib has a stepped structure,
    the wing lower surface skin is connected to a lower step surface of each skin supporting rib,
    each crank-shaped flap supporting rib has a stepped structure,
    the flexible flap skin is connected to an upper step surface of each crank-shaped flap supporting rib, each crank-shaped flap supporting rib is connected to the lower surface of each skin supporting rib through the connecting shaft, and in a normal flight state, under the force of the return spring, the upper step surface of each crank-shaped flap supporting rib is fit close to the lower step surface of each skin supporting rib.

12. The foldable wing with foldable trailing edge flap of claim 11, wherein:

the foldable trailing edge flap further comprises a plurality of flap slits, when the foldable trailing edge flap is adjusted downward, the plurality of flap slits are formed between a lower step area of each crank-shaped flap supporting rib and the wing lower surface skin, and the plurality of flap slits are configured to extend the airflow on the lower surface of the wing to a trailing edge of the wing.

13. The foldable wing with foldable trailing edge flap of claim 1, wherein the flap drive device provides power for the flexible linkage main cable through a swing arm, a variable speed gear, or a chain.

\* \* \* \* \*